Oct. 20, 1931.  D. E. AILMAN  1,828,093
GAUGE PROTECTOR
Filed Jan. 3, 1927

INVENTOR.
David E. Ailman
BY Nestall and Wallace
ATTORNEYS.

Patented Oct. 20, 1931

1,828,093

UNITED STATES PATENT OFFICE

DAVID E. AILMAN, OF WILLOWS, CALIFORNIA

GAUGE PROTECTOR

Application filed January 3, 1927. Serial No. 158,584.

This invention relates to a device to be used in conjunction with a pressure indicating means and connected with a chamber or space within which the pressure of a fluid is to be shown and at the same time, the fluid being prevented from entering the pressure indicating means. This is of particular advantage in the drilling of an oil well where pumps are used to force a mixture of water and various solids, known as "mud" or "slush", or a mixture of water and cement, into the well under high pressure. It is desirable to know the amount of this pressure, and it is customary to connect a gauge of the usual type directly to the pump or discharge line. Such gauges have delicate mechanism and the solid matter in the mixture being pumped frequently clogs this, damaging the gauge and rendering it inoperative. It is an object of this invention to provide a gauge and a device for insertion ahead of such gauge, to prevent the mixture from entering it with resultant damage. The mechanism of the gauge is also subject to rupture, and it is of great importance to maintain the pressure of this fluid at certain times. Another object of this invention is to provide a device which will automatically close when such rupture occurs, and make it possible to maintain the supply of fluid to the well. A further object of this invention is to provide a device of the character described which is inexpensive to make, easy to install and maintain in first class working condition, and of rugged construction.

Figure 1:
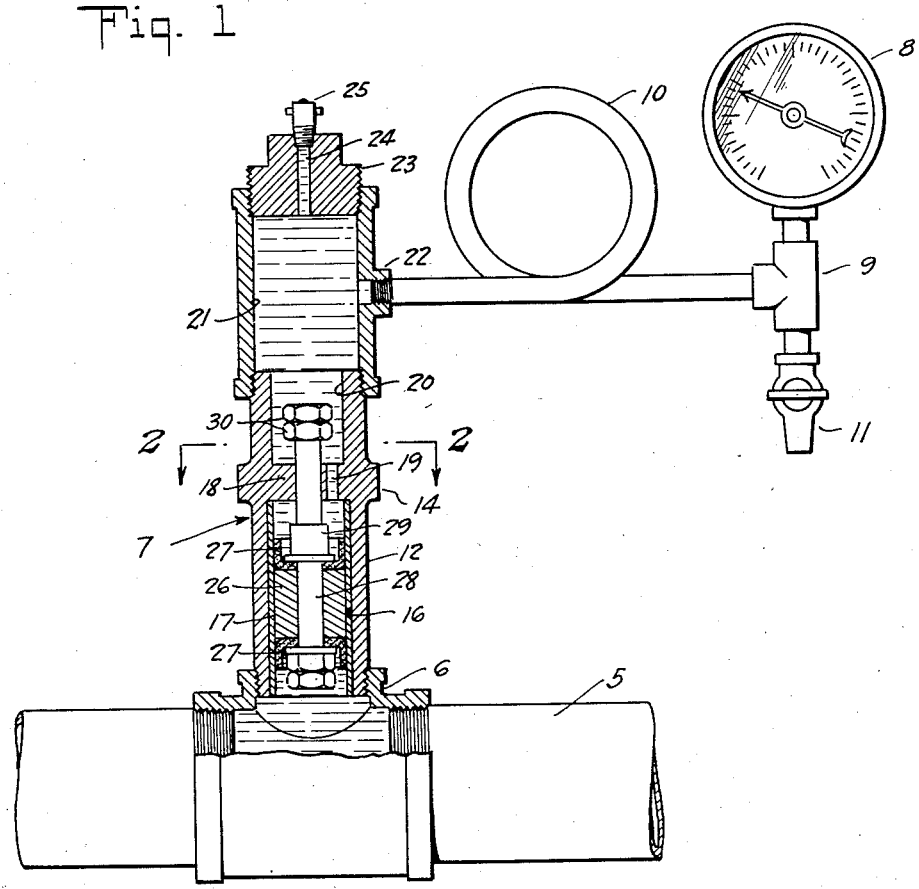
Figure 2:
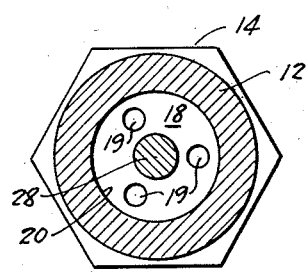

These objects, together with other objects and corresponding accomplishments are obtained by means of the embodiment of my invention shown in the accompanying drawings, in which:

Fig. 1 is a vertical section taken on the center line of my gauge protector, showing it interposed between a line of pipe and an ordinary pressure gauge; Fig. 2 is a section as seen on the line 2—2 of Fig. 1.

Referring more particularly to the drawings, a line of pipe carrying fluid under pressure is indicated by 5 and is provided with a T 6 into which is threaded my gauge protector, indicated generally by 7. A pressure gauge 8 is connected therewith by a T 9 and pipe 10, which in this case is an ordinary steam gauge; the lower end of T 9 is provided with a pet cock 11, for a purpose later described.

The gauge protector 7 consists of a cylindrical body 12 with threaded ends and an intermediate hexagonal portion 14, adapted to be gripped with a wrench. The body is provided with a bore 16, opening into T 6, and provided with a sleeve 17, for ready replacement in case of wear. The upper end of the bore is closed by a head or wall 18, provided with ports 19, and above this is a cylindrical cavity 20. At the upper end of body 12, a chamber 21 is formed, in this case, by a reducing T threaded thereon having an outlet 22, connected with the gauge and having its upper end closed by a threaded plug 23. This plug has an opening 24 through it, closed by a check valve nipple 25 of the type used with grease guns for forcing grease into a system under pressure.

Slidable within the sleeve 17 is a piston 26 provided with cup leathers 27, or other suitable packing, forming a pressure responsive wall, and secured to a rod 28. Rod 28 slides in a suitable opening through partition 18, and is provided with an annular shoulder 29 and nuts 30 at its upper end to limit its movement by striking against the partition.

The device complete with gauge is mounted in place on the pipe line, or pump body. Pet cock 11 is then opened, and grease or heavy oil is introduced through check valve 25, into the chamber 21 and thence into pipe 10 and possibly into the gauge, most of the air contained in these being forced out through the pet cock. The small quantity of air which may remain trapped in the gauge will not matter. The piston 26 should be at its lowest point meanwhile and if necessary can be forced there by closing the pet cock and building up pressure in the chamber and passage above. After the piston has been forced down, the pet cock is opened, releasing the pressure and bringing the gauge to zero. The device is now ready for use and operates in the following manner. Pressure in the pipe 5 is communicated to the bore of body 12 and acts on the lower side of piston 26, forcing it in an upward direction. The oil on the upper side of the piston and in chamber 21 and connecting passages is confined by check valve 25, and forced by the movement of the piston into the gauge 8. It is plain that the pressures on opposite sides of the piston will be equal and that therefore the pressure shown on the gauge will be the same as the pressure in the pipe. Furthermore the packing on the piston will prevent any grit or solid matter getting past it into the gauge. In the event of failure of any of the parts above the body which would allow the oil to escape, piston 26 merely travels to the upper limit of its stroke and is held there, the packing meanwhile preventing any escape of mud or slush. Thus in the event of the gauge breaking it would not be necessary to shut down the pumps until convenient to do so.

What I claim is:

A gauge protector comprising a hollow cylindrical member adapted to be secured at one end to a source of fluid under pressure, a ported head at the opposite end, a piston responsive to pressure slidably mounted in the bore of said member and arranged to be limited in its travel by the head, a fluid transmission chamber mounted on said cylinder and communicating with the bore of said member through said ports and adapted to be connected to a pressure gauge, and a check valve nipple connected to said chamber for introduction of fluid into said chamber.

In witness that I claim the foregoing I have hereunto subscribed my name this 9th day of December, 1926.

DAVID E. AILMAN.